United States Patent
Kimura (10) Patent No.: US 8,514,422 B2
(45) Date of Patent: Aug. 20, 2013

(54) IMAGE FORMING APPARATUS THAT CONTROLS JOB PROCESSING ON THE BASIS OF AUTHENTICATION

(75) Inventor: Atsushi Kimura, Osaka (JP)

(73) Assignee: KYOCERA Document Solutions Inc. (JP)

(*) Notice: Subject to any disclaimer, the term of this patent is extended or adjusted under 35 U.S.C. 154(b) by 765 days.

(21) Appl. No.: 12/701,329

(22) Filed: Feb. 5, 2010

(65) Prior Publication Data

US 2010/0271651 A1    Oct. 28, 2010

(30) Foreign Application Priority Data

Apr. 28, 2009    (JP) .................... 2009-109691

(51) Int. Cl.
*G06K 15/00* (2006.01)
(52) U.S. Cl.
USPC .............. 358/1.14; 399/80; 399/82; 399/366; 726/2; 726/26
(58) Field of Classification Search
USPC ................ 358/1.14; 399/366, 80, 82; 726/2, 726/27
See application file for complete search history.

(56) References Cited

U.S. PATENT DOCUMENTS

| 2005/0073709 | A1 | 4/2005 | Kujirai et al. | |
| 2006/0061833 | A1* | 3/2006 | Kikuchi et al. | 358/474 |
| 2006/0092455 | A1* | 5/2006 | Maeda et al. | 358/1.15 |
| 2007/0294532 | A1 | 12/2007 | Kujirai et al. | |
| 2008/0239382 | A1 | 10/2008 | Matsueda | |
| 2009/0273800 | A1* | 11/2009 | Morales | 358/1.15 |
| 2011/0096350 | A1 | 4/2011 | Kujirai et al. | |
| 2011/0310426 | A1 | 12/2011 | Kujirai et al. | |

FOREIGN PATENT DOCUMENTS

| JP | 08-286895 | 1/1996 |
| JP | 10-289076 | 10/1998 |
| JP | 2001-312377 | 11/2001 |
| JP | 2008-257342 | 10/2008 |

OTHER PUBLICATIONS

TIFF Revision 6.0, Adobe Developers Association, pp. 1-50, Jun. 3, 1992, Mountain View, CA.
TIFF Revision 6.0, Adobe Developers Association, pp. 51-121, Jun. 3, 1992, Mountain View, CA.

* cited by examiner

*Primary Examiner* — Peter K Huntsinger
(74) *Attorney, Agent, or Firm* — McDonnell Boehnen Hulbert & Berghoff LLP (57) ABSTRACT

An image forming apparatus according to an embodiment of the invention includes a reading unit, authentication unit, job processing control unit, and output unit. The reading unit sequentially performs reading of low jobs making up a high job. The authentication unit stores a user information table in which user information elements on authorized users are registered and sequentially determines whether each low job is proper or improper by verifying a user information element corresponding to the low job against the user information table to carry out authentication. The job processing control unit controls, if a low job is determined to be improper in the determination, an operation of skipping the low job determined to be improper and sequentially performing the reading and determination on subsequent low jobs. The output unit outputs a low job determined to be proper in the determination.

18 Claims, 9 Drawing Sheets

| MANAGEMENT NUMBER | USER ID | USER NAME | IP ADDRESS | RANK | ... |
|---|---|---|---|---|---|
| 0001 | aaa111 | Taro Yamada | 192.168.1.1 | A | ... |
| 0002 | bbb222 | Hanako Inoue | 192.168.1.2 | B | ... |
| 0003 | ccc333 | Ichiro Suzuki | 192.168.1.3 | C | ... |
| ... | ... | ... | ... | ... | ... |

FIG. 9

IMAGE FORMING APPARATUS THAT CONTROLS JOB PROCESSING ON THE BASIS OF AUTHENTICATION

INCORPORATION BY REFERENCE

This application is based upon and claims the benefit of priority from the corresponding Japanese Patent Application No. 2009-109691, filed Apr. 28, 2009, the entire contents of which is incorporated herein by reference.

BACKGROUND OF THE INVENTION

1. Field of the Invention

The present invention relates to an image forming apparatus that controls job processing on the basis of authentication, a computer-readable recording medium that stores job processing program codes, and a job processing method.

2. Description of the Related Art

In order to improve security in printers, multifunction peripherals, and other devices, an authentication function has been introduced into many image forming apparatuses in order to authenticate print data received from unspecific host computers.

Such an image forming apparatus having the authentication function verifies a user information element contained in a job (print data) against a user information element registered in advance in the main body of the apparatus or an outside source. The authentication function permits the job to be output if the user information elements match each other. By contrast, if the two user information elements do not match, an error is indicated and job processing for the job is stopped.

In response to a predetermined operation following occurrence of an error, the job is deleted, and the error indication is removed.

Such an image forming apparatus may operate on a single job (hereinafter referred to as a high job) into which a plurality of jobs (hereinafter referred to as low jobs) is combined in the process of job processing. This internal processing improves the efficiency of data processing. Typically, users are unaware of how this processing proceeds.

Accordingly, in order to process such a plurality of jobs, the above image forming apparatus needs a plurality of authentication actions corresponding to the number of low jobs. If a high job contains even one low job that cannot establish its authenticity, the high job cannot be properly authenticated. Therefore the entire job processing is stopped. That is, even one improper low job contained in a high job affects processing for other proper low jobs.

To address this problem, a printer that can cancel only a specific part of a single print job has been disclosed. Similarly, a job processing apparatus that can cancel a specific document contained in a multiple-document job has been disclosed.

Unfortunately, with the above techniques, a human needs to identify an area to be cancelled, in which an authentication error occurs (e.g., a low job that cannot establish its authenticity).

As a result, every time an authentication error occurs, a tedious operation is required. In particular, this tendency is strong for jobs having a large number of tasks or an enormous amount of data.

SUMMARY OF THE INVENTION

An image forming apparatus according to an embodiment of the present invention includes a reading unit, an authentication unit, a job processing control unit, and an output unit. The reading unit is configured to sequentially read of a plurality of low jobs making up a high job, wherein each of the low jobs has a corresponding user information element. The authentication unit is configured to determine whether each of the low jobs is proper or improper by verifying the user information element against a user information table to carry out authentication, wherein the user information table includes a registration of user information elements indicating authorized users. The job processing control unit is configured to control in a skip mode, if a low job is determined to be improper, an operation of skipping the low job determined to be improper and sequentially performing the reading and determination on subsequent low jobs. The output unit is configured to output a low job determined to be proper.

A computer-readable recording medium according to an embodiment of the present invention stores job processing program codes that are executed by a computer of an image forming apparatus. The job processing program codes include five program codes. The first program code causes the computer to sequentially read a plurality of low jobs making up a high job. The second program code causes the computer to store a user information table in which user information elements on authorized users are registered. The third program code causes the computer to sequentially carry out authentication by determining whether each of the low jobs is proper or improper by verifying a user information element corresponding to the low job against the user information table. The fourth program code causes the computer to control in a skip mode, if a low job is determined to be improper in the determination, an operation of skipping the low job determined to be improper and sequentially performing the reading and determination on subsequent low jobs. The fifth program code causes the computer to output a low job determined to be proper in the determination.

A job processing method according to an embodiment of the present invention includes (1) a reading unit sequentially reading a plurality of low jobs making up a high job, (2) an authentication unit storing a user information table in which user information elements on authorized users are registered, (3) the authentication unit sequentially determining whether each of the low jobs is proper or improper by verifying a user information element corresponding to the low job against the user information table, to carry out authentication, (4) a job processing control unit controlling, in a skip mode, if a low job is determined to be improper, an operation of skipping the low job determined to be improper and sequentially performing the reading and determination on subsequent low jobs, and (5) an output unit outputting a low job determined to be proper in the determination.

Additional features and advantages are described herein, and will be apparent from the following Detailed Description and the figures.

DESCRIPTION OF THE PREFERRED EMBODIMENTS

An embodiment of the present invention is described below with reference to FIGS. 1 to 9.

Figure 1:
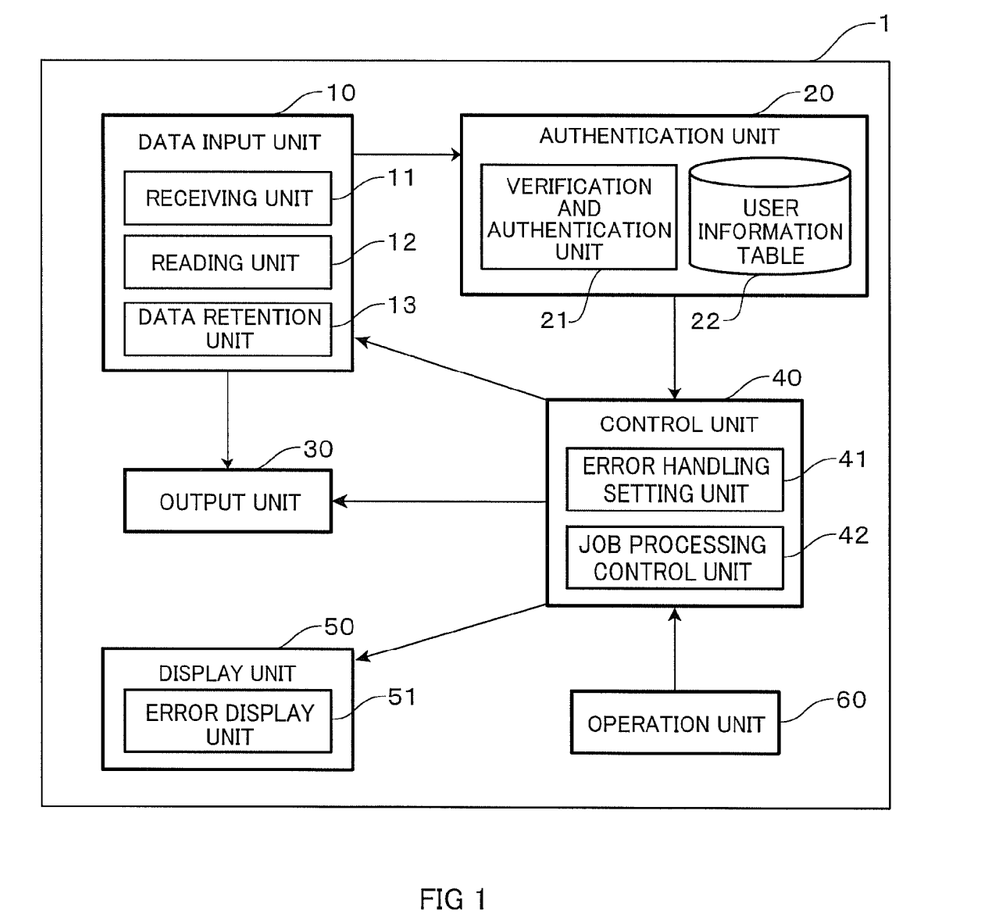
FIG. 1 shows a block diagram that illustrates a detailed configuration of an image forming apparatus according to an embodiment of the present invention.

FIG. 1 shows a block diagram that illustrates a detailed configuration of an image forming apparatus according to the embodiment of the present invention.

As illustrated in FIG. 1, the image forming apparatus 1 according to the embodiment of the present invention includes a data input unit 10, an authentication unit 20, an output unit 30, a control unit 40, a display unit 50, and an operation unit 60.

The data input unit 10 has a control board and, as illustrated in FIG. 1, includes a receiving unit 11, a reading unit 12, and a data retention unit 13.

The receiving unit 11 is a communication interface, such as a NIC (network interface card), and receives a job (print data) to be output from, for example, a host computer via a network and inputs it into the data retention unit 13.

Figure 2:
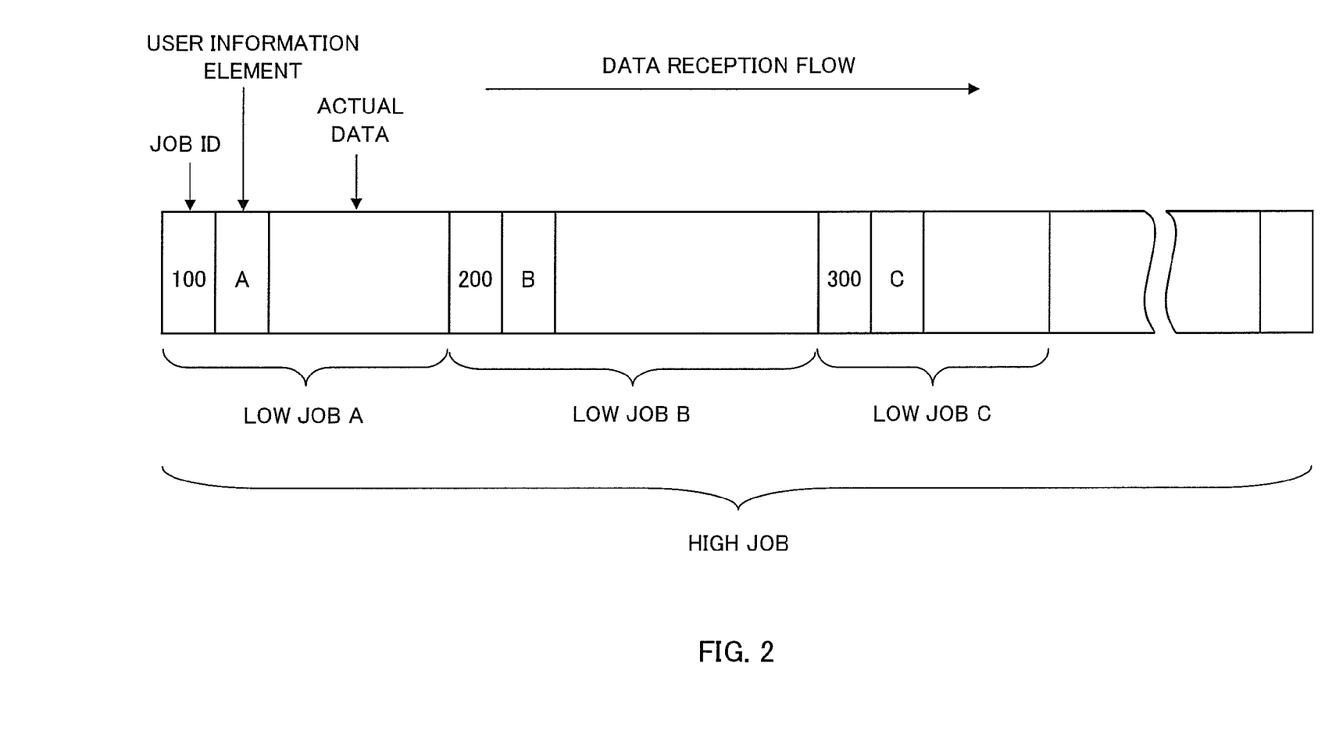
FIG. 2 shows a configuration example of a job input into the image forming apparatus according to an embodiment of the present invention.

In the present embodiment, a job (a high job made up of a plurality of low jobs) illustrated in FIG. 2 is input. The high job illustrated in FIG. 2 includes a low job A, a low job B, and a low job C. Each of the low jobs includes a job ID (identification), a user information element, and actual data. The job IDs are given serial numbers in the order in which the low jobs are received by the receiving unit 11 (that is, in the order of print data reception flow). The user information element is information on the user and is defined in a user information table described below. The actual data is data to be output and printed on a sheet of paper. The high job has a terminator added at its backend. The terminator indicates the end of the high job.

The reading unit 12 reads data necessary for authentication of the input job.

For example, the reading unit 12 reads the low jobs (low jobs A to C), which are small units of jobs, from the high job illustrated in FIG. 2.

The reading unit 12 reads a low job beginning from its job ID and acquires a user information element added in the low job.

For example, in the case of FIG. 2, the reading unit 12 reads the low jobs A, B, and C in sequence along the "data reception flow" arrow illustrated in the drawing. With this, the reading unit 12 acquires the user information elements A, B, and C in sequence.

The data retention unit 13 has a control board that temporarily stores actual data and its related data (e.g., a user information element and job ID) of a low job read by the reading unit 12 in, for example, a non-volatile memory. The read user information element can be stored in association with the job ID of the corresponding low job.

The authentication unit 20 has a control board and, as illustrated in FIG. 1, includes a verification and authentication unit 21 and a user information table 22.

The verification and authentication unit 21 extracts a user information element from the data retention unit 13 and verifies it against a set of user information elements registered in advance in the user information table 22.

In the case of FIG. 2, in response to the reading of user information elements, the verification and authentication unit 21 verifies in the sequence of the user information elements A, B, and C.

If the verification shows that a corresponding user information element is found in the user information table 22, the verification and authentication unit 21 authenticates the user associated with the user information element and determines that the low job associated with the user information element is proper. By contrast, if the verification shows that no corresponding user information element is found in the user information table 22, the verification and authentication unit 21 does not authenticate the user associated with the user information element and determines that the low job is improper.

The "corresponding user information element" used herein indicates a "user information element on a user who is authorized to enable data to be output". In addition to the identity of user information elements, a rank or class in output limiting may also be included as a factor in authentication determination.

The user information table 22 has information on registered users and is stored in a storage medium, such as a hard disk or USB (universal serial bus) memory, by the authentication unit 20.

Figure 3:
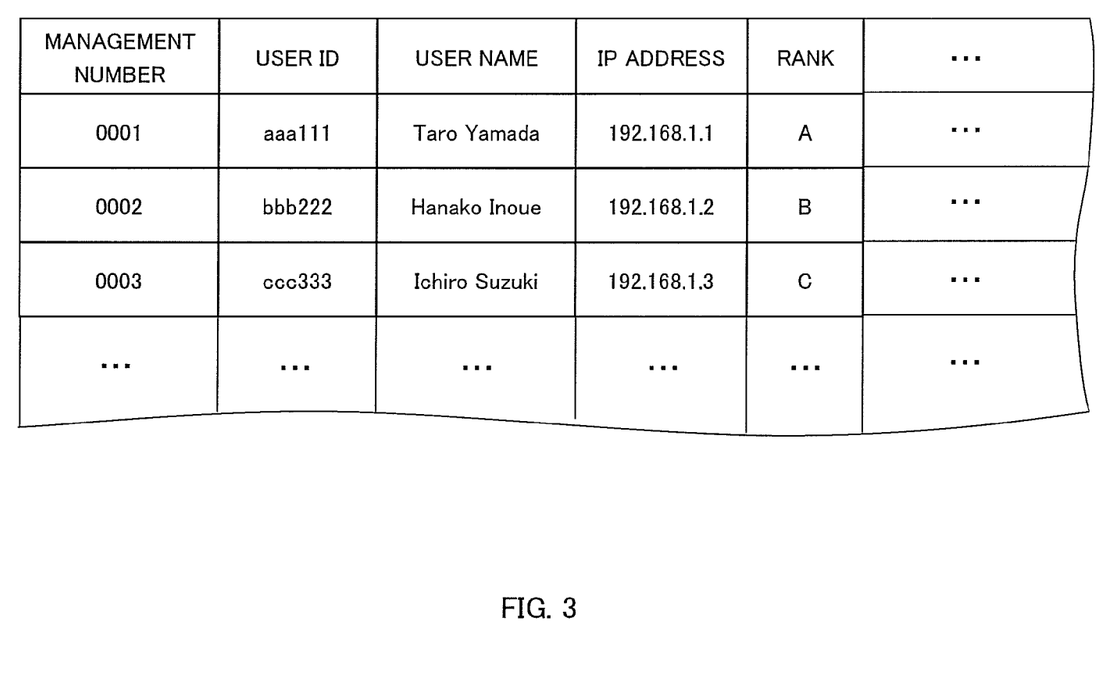
FIG. 3 shows an example of a user information table according to an embodiment of the present invention.
Figure 4:
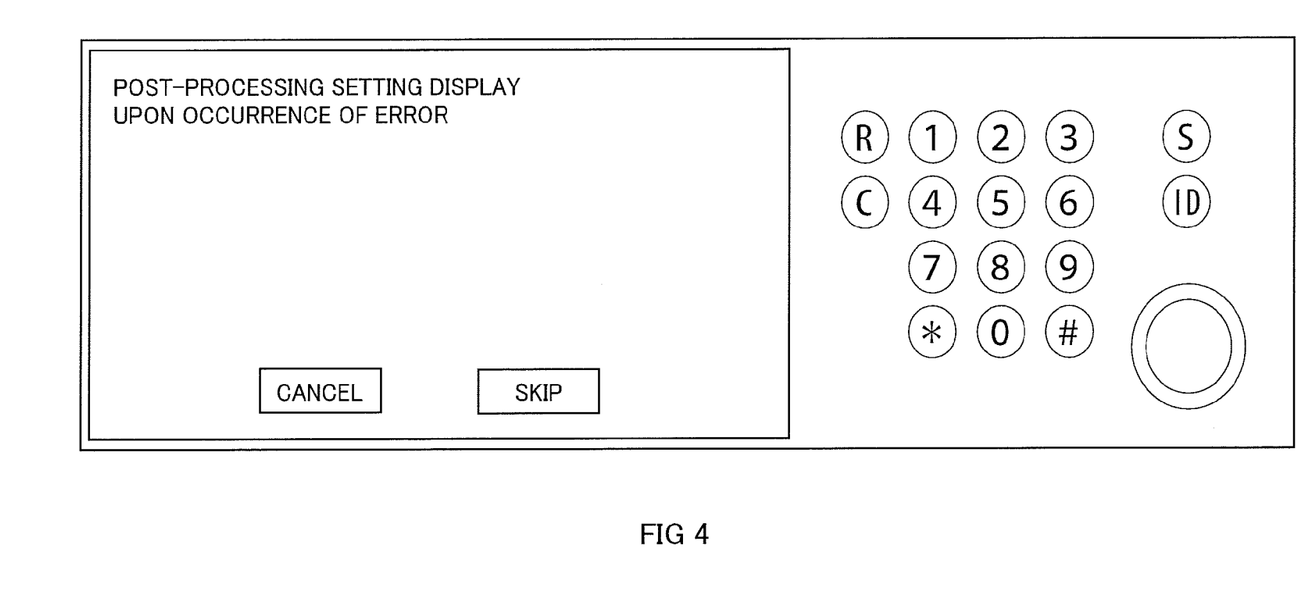
FIG. 4 shows a display example of an operation display panel according to an embodiment of the present invention.

For example, as illustrated in FIG. 3, a user ID, a user name, and/or an IP (Internet Protocol) address can be registered as a user information element for a user (or a user terminal) who is authorized to enable data to be output.

A rank in output limiting can be registered in the user information table 22. For example, the rank A can indicate that the use of all functions, including color outputting and document boxes, is permitted. The rank B can indicate that only monochrome outputting is permitted. The rank C can indicate that outputting is not permitted. Such ranks can be registered for each user (or user terminal) or group (organization). Accordingly, flexible settings can be made by a security policy.

The user information table 22 may be stored in an internal storage medium of the image forming apparatus 1 (in the case of a local authentication system), or alternatively, may be stored in a storage device of an authentication server connected via a network (in the case of a network authentication system).

The output unit 30 has a control board that executes image output processing on a job received from the data retention unit 13 based on a predetermined form. Specifically, the control board converts image data contained in a target job into bitmapped image data. The output unit 30 further has a print engine that develops the bitmapped image data on a print head or a photosensitive drum and transfers and fixes it using toner on a sheet of print paper supplied from a paper feed mechanism.

The control unit 40 has a control board and, as illustrated in FIG. 1, includes an error handling setting unit 41 and a job processing control unit 42.

The error handling setting unit 41 sets in advance an operation (mode) to be performed when an authentication error occurs.

Specifically, for example, either a "skip mode" or a "cancel mode" can be set by an operation of a user through the operation unit 60.

The job processing control unit 42 controls job processing according to the mode setting made through the operation unit 60.

Specifically, if a read low job is determined to be proper at the "skip mode" setting, the job processing control unit 42 causes the output unit 30 to output (perform printing processing on) that low job. By contrast, if a read job is determined to be improper at the "skip mode" setting, the job processing control unit 42 recognizes that an authentication error occurs in that low job. Then, the job processing control unit 42 instructs the reading unit 12 to automatically skip that low job and read subsequent low jobs. Furthermore, the job processing control unit 42 instructs the verification and authentication unit 21 to sequentially determine whether each low job is proper or improper.

The job processing control unit 42 does not instruct the output unit 30 to output a subsequent proper low job until the error indication associated with the improper low job is removed (i.e. the authentication error is eliminated). This suspends outputting of the proper low job.

Accordingly, the occurrence of the authentication error can be recognized by a user, while at the same time, processing can continue for subsequent proper jobs. Subsequent proper jobs are output once the authentication error indication is removed.

Even when the error indication is not removed (authentication error is not eliminated), the job processing control unit 42 instructs the reading unit 12 to read low jobs subsequent to the detected proper low job and instructs the verification and authentication unit 21 to determine whether each low job is proper or improper. That is, certain processing prior to outputting is performed without waiting.

Such control enables pre-processing (prior to outputting) to be performed in advance on proper low jobs. Therefore, the proper jobs can be output promptly in response to elimination of the authentication error.

If an authentication error occurs in a low job at the "cancel mode" setting, the job processing control unit 42 instructs the reading unit 12, the verification and authentication unit 21, and the output unit 30 to cancel reading, determining whether each low job is proper or improper, and outputting on all subsequent low jobs from that point forward.

Then, if an operation for confirming cancellation (i.e., a cancel operation) is carried out through the operation unit 60, the job processing control unit 42 deletes the low jobs canceled from the data retention unit 13.

The display unit 50 has a control board that provides a user with various kinds of information through a display device, such as a liquid crystal display panel.

As illustrated in FIG. 1, the display unit 50 includes an error display unit 51.

Figure 5:
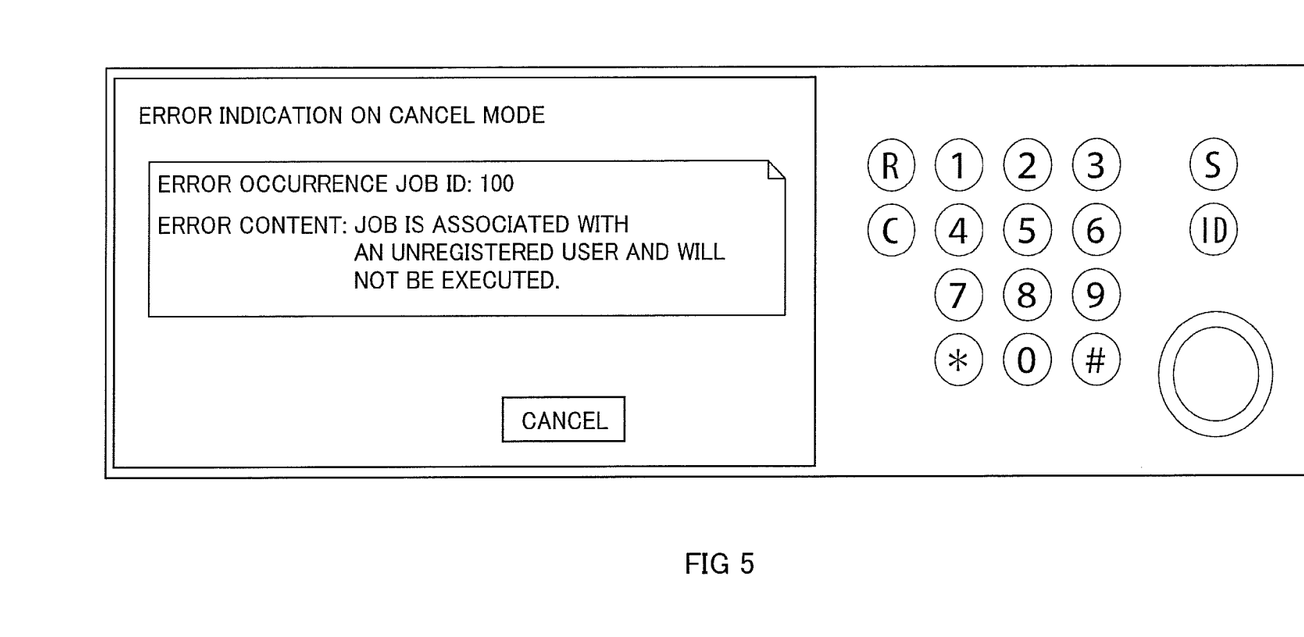
FIG. 5 shows another display example of the operation display panel according to an embodiment of the present invention.
Figure 6:
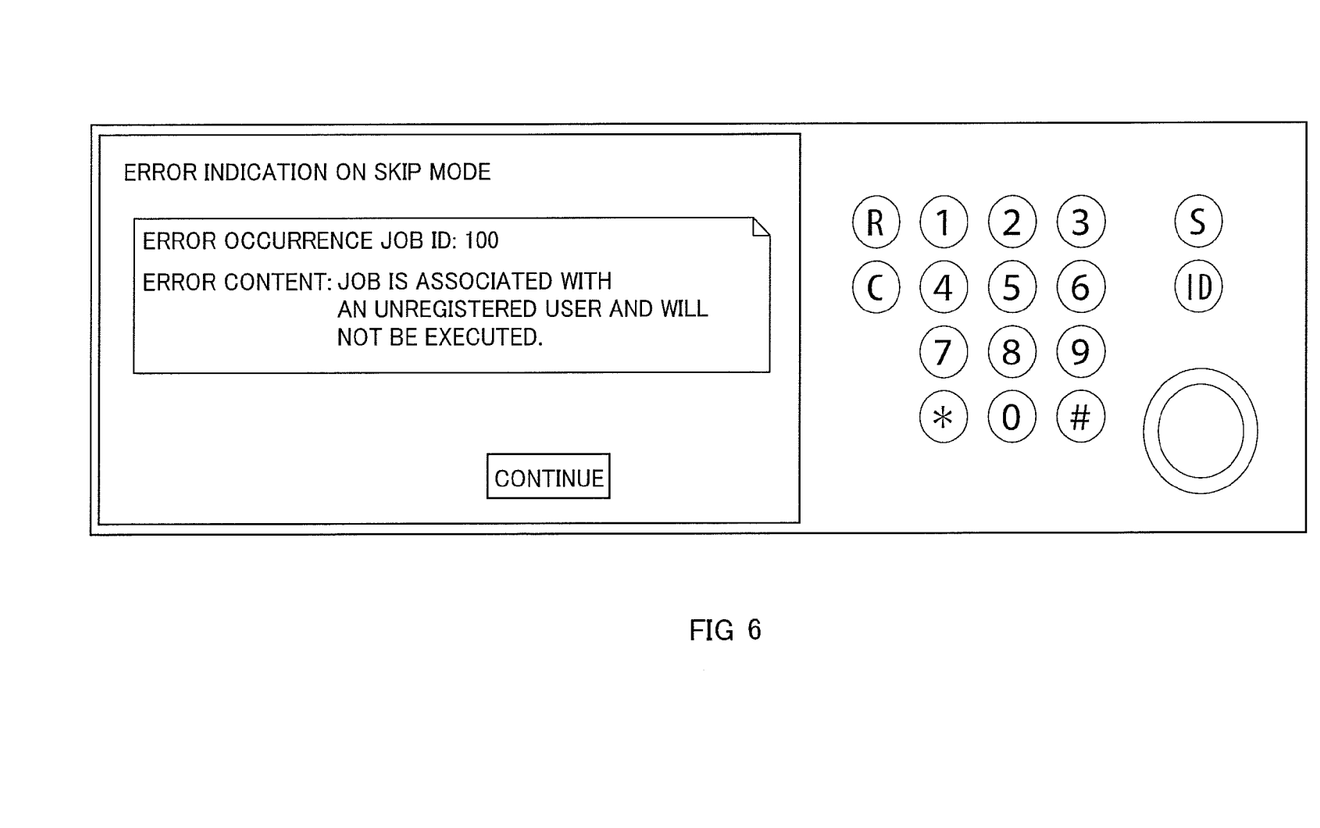
FIG. 6 shows still another display example of the operation display panel according to an embodiment of the present invention.

If an authentication error occurs, the error display unit 51 displays an error message, such as the ones illustrated in FIGS. 5 and 6, on the display device.

As illustrated in these drawings, an error indication can contain the job ID of a low job that is the source of the authentication error, for example. This enables a user to recognize which job causes the error.

The operation unit 60 can be composed of an operating panel and has a control board that inputs various kinds of information through operation on a touch key, pointing device, touch panel, or other components.

For example, a mode-selection operation is possible as a job processing operation, upon the occurrence of an authentication error. If the "CANCEL" key is selected on an operating screen illustrated in FIG. 4, "cancel mode" is set; if the "SKIP" key is selected, "skip mode" is set.

As illustrated in FIG. 5, when the cancel mode is set, if the "CANCEL" key is selected after an authentication error occurs, the cancellation occurs, for example.

As illustrated in FIG. 6, when the skip mode is set, if the "CONTINUE" key is selected after an authentication error occurs, the error display unit 51 removes the error indication. At this time, the job processing control unit 42 can restart pending outputting of a proper job and also continue subsequent job processing (reading, determining whether each low job is proper or improper, and outputting).

Figure 9:
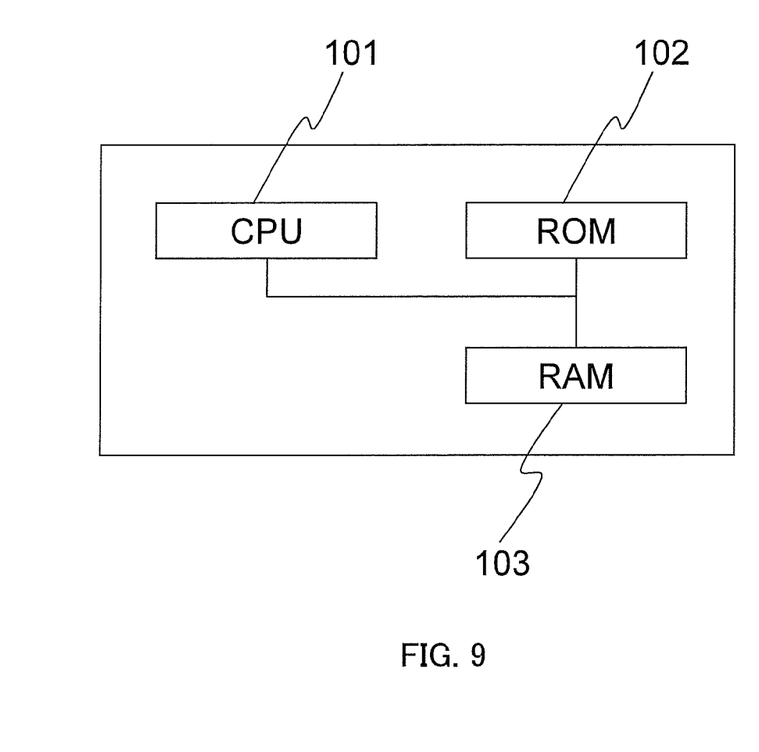
FIG. 9 shows an example of hardware architecture of a control board according to an embodiment of the present invention.

The control board of each of the data input unit 10, the authentication unit 20, the output unit 30, the control unit 40, the display unit 50, and the operation unit 60 has a configuration illustrated in FIG. 9. The control board includes a control element, such as a CPU (central processing unit) 101 or a chip set, a ROM (read-only memory) 102, and a RAM (random-access memory) 103. The control boards work in cooperation with one another and form the computer of the image forming apparatus 1. The CPU 101 is a processor controller that executes processing described in a program. The ROM 102 is a non-volatile memory that stores in advance a program and data. The RAM 103 is a memory that temporarily stores a program and data and is used as a working area during execution of the program.

By the execution of the program, the control boards configure the above functional units within the CPU and make the hardware elements of the respective units function as the data input unit 10, the authentication unit 20, the output unit 30, the control unit 40, the display unit 50, and the operation unit 60, respectively.

An operating process for job processing according to the embodiment of the present invention is described below with reference to the drawings.

Figure 7:
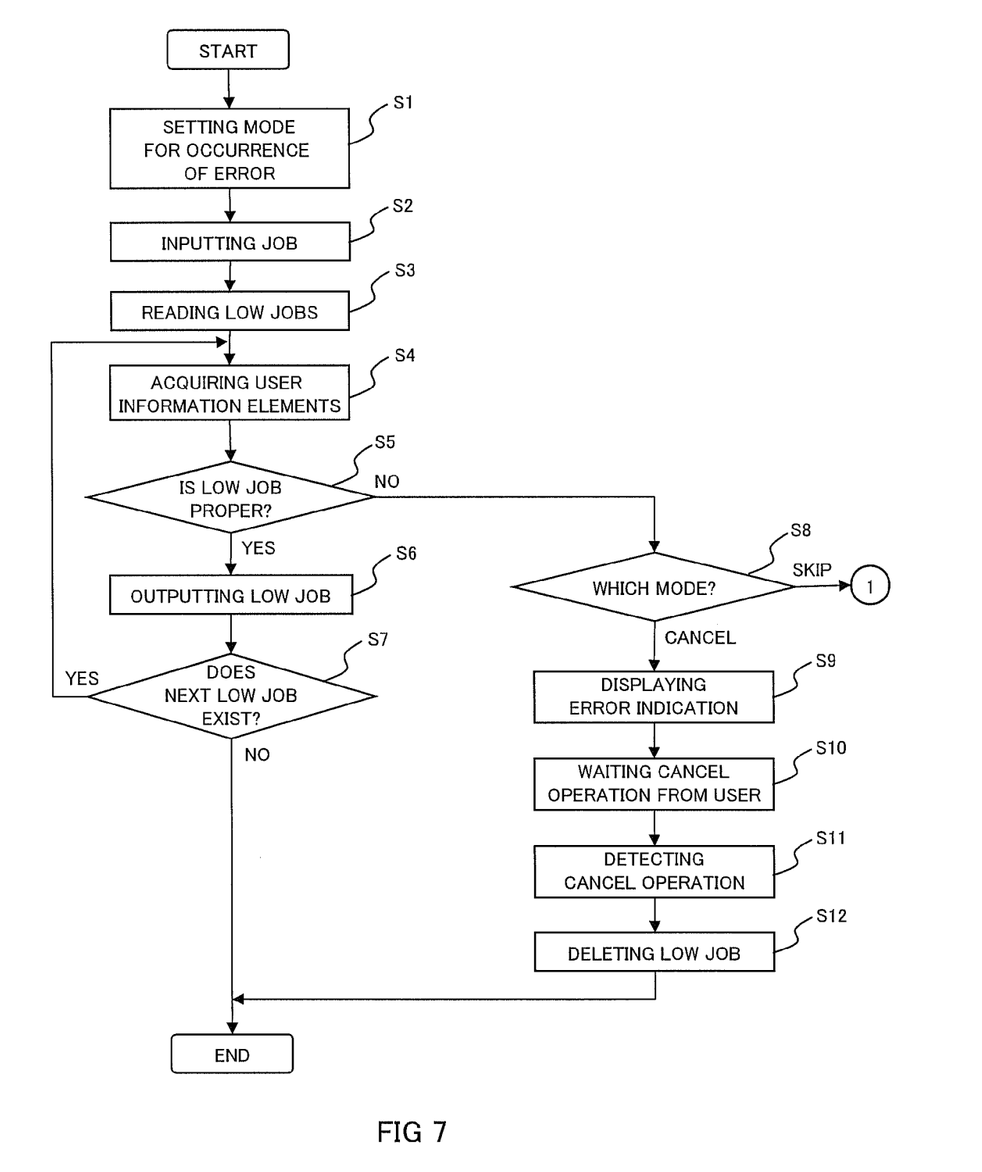
FIG. 7 shows a flowchart that illustrates an operating process for job processing according to an embodiment of the present invention.
Figure 8:
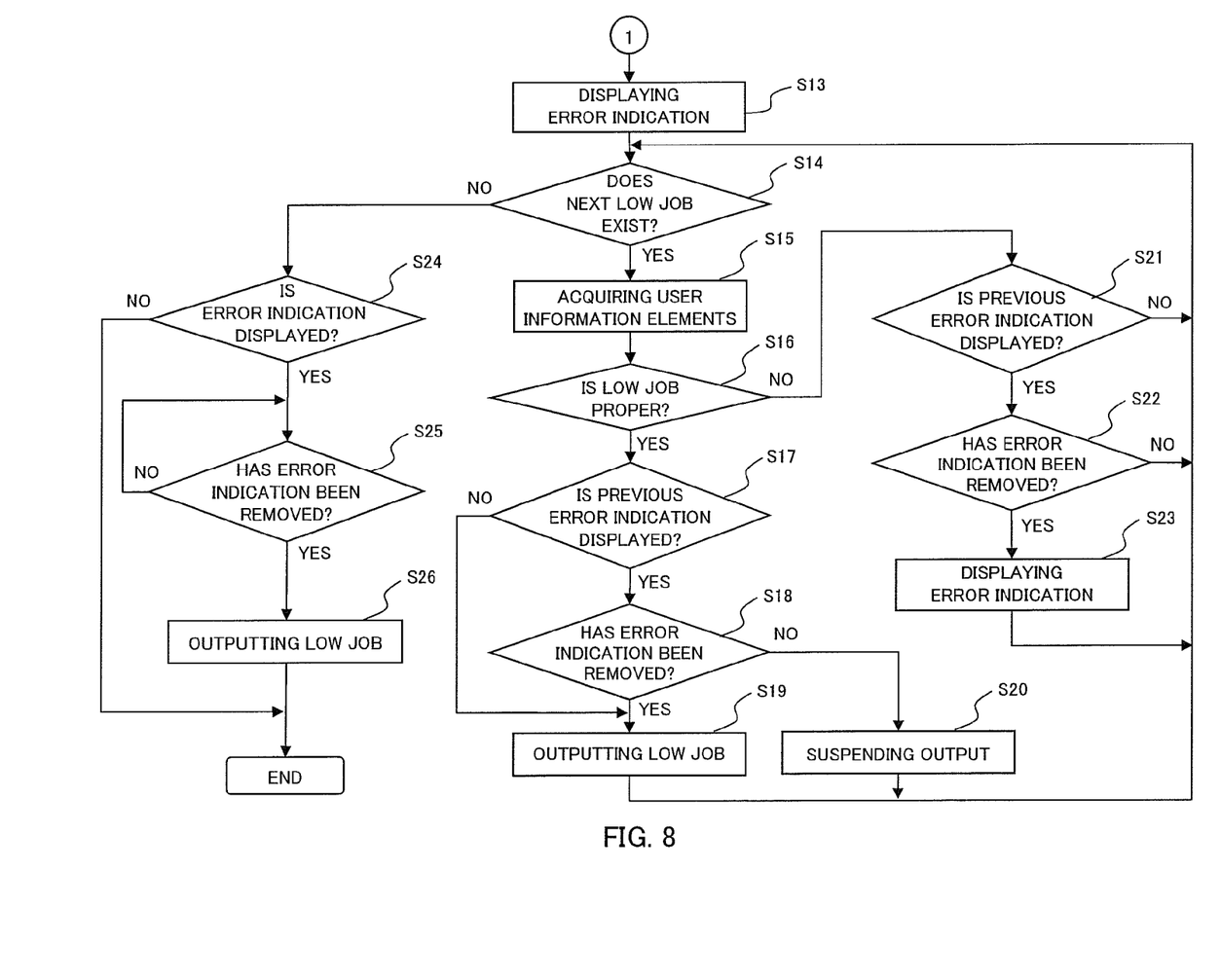
FIG. 8 shows a flowchart that illustrates another operating process for the job processing according to an embodiment of the present invention.

FIGS. 7 and 8 show flowcharts that illustrate the operating processes for the job processing according to the embodiment of the present invention.

As illustrated in FIG. 7, first, prior to the job processing, the error handling setting unit in the control unit sets the mode for the occurrence of an authentication error (S1).

Specifically, either "skip mode" or "cancel mode" is selected by an input operation through the operation unit. The error handling setting unit sets the selected mode.

In the data input unit, the receiving unit receives a job (print data) from, for example, a host computer (not shown) and inputs it into the data retention unit (S2).

Then, the reading unit in the data input unit sequentially reads low jobs within the job (S3).

Next, the reading unit sequentially acquires user information elements from the read low jobs (S4). The data retention unit stores the acquired user information elements in its memory.

The verification and authentication unit in the authentication unit determines whether the low job corresponding to each user information element read in step S4 is proper or improper (S5).

Specifically, the verification and authentication unit extracts a user information element from the data retention unit and verifies it against registered information of the user information table in the authentication unit. If a corresponding information element is found in the user information table, the verification and authentication unit determines that the low job is proper; otherwise, it determines that the low job is improper.

If it is determined that the low job is proper (YES in S5), the job processing control unit in the control unit causes the output unit to output that low job (S6).

Subsequently, the reading unit determines whether a next low job exists (S7). For example, if detecting a specific terminator or disconnection of a session in port, the reading unit can determine that no next low job exists.

If it is determined that a next low job exists (YES in S7), flow proceeds to step S4, where the user information element corresponding to the next low job is acquired.

If it is determined that no next low job exists (NO in S7), processing for the input job (high job) is completed.

That is, if a high job contains no improper low job, a series of low jobs is sequentially output.

In step S5, if it is determined that the low job is improper (NO in S5), the job processing control unit checks the operational mode set for the occurrence of an error (S8).

Specifically, the job processing control unit determines whether the mode set in step S1 is the skip mode or cancel mode.

In step S8, if it is determined that the setting is the cancel mode (Cancel in S8), the error display unit in the display unit displays an error message such as the one illustrated in FIG. 5 (S9).

Next, the job processing control unit waits for a cancel operation from a user through the operation unit (S10).

Then, when detecting the cancel operation through the operation unit (S11), in step S12, the job processing control unit deletes the low job determined to be improper in step S5.

In step S8, if it is determined that the setting is the skip mode (Skip in S8), flow proceeds to step S13 illustrated in FIG. 8. In step S13, the error display unit displays an error message such as the one illustrated in FIG. 6.

Subsequently, in step S14, the reading unit determines whether a next low job exists, as in step S7.

If it is determined that a next low job exists (YES in S14), the job processing control unit skips over the low job determined to be improper in S5 (or later S16). Subsequently, the reading unit acquires the user information element of the next low job (S15), as in step S4. The reading unit stores the acquired user information element in the data retention unit.

Next, the verification and authentication unit determines whether the next low job is proper or improper (S16).

If it is determined that the next low job is proper (YES in S16), the job processing control unit determines whether the previous error indication is being displayed (S17).

If it is determined that the previous error indication is being displayed (YES in S17), subsequently, the job processing control unit determines whether that error indication has been removed (that is, whether the "CONTINUE" key has been selected in FIG. 6) (S18).

In step S17, if it is determined that no previous error indication is being displayed (NO in S17), flow proceeds to step S19. In step S18, if it is determined that the previous error indication has been removed (YES in S18), the error display unit removes the error indication, and flow proceeds to step S19.

In step S19, the output unit outputs the next low job and, if any, a low job whose output is suspended in step S20.

In step S18, when the previous error indication has not been removed (NO in S18), outputting of the next low job is temporarily suspended (S20).

In step S16, if it is determined that the low job is improper (NO in S16), the job processing control unit determines whether the previous error indication is being displayed (S21).

If it is determined that the previous error indication is being displayed (YES in S21), subsequently, the job processing control unit determines whether that error indication has been removed (that is, whether the "CONTINUE" key has been selected in FIG. 6) (S22).

In step S22, if it is determined that the previous error indication has been cancelled (YES in S22), the error display unit displays an error message such as the one illustrated in FIG. 6 (S23). The job ID of the low job that causes the error displayed in step S23 is different from the job ID of the low job that causes the previous error and corresponds to the low job determined to be improper in step S16.

If it is determined in step S21 that no previous error indication is being displayed (NO in S21) or if it is determined in step S22 that the error indication has not been removed (NO in S22), flow proceeds to step S14.

In step S14, if it is determined that there is no next low job (NO in S14), subsequently, the job processing control unit determines whether the previous error indication is being displayed (S24).

If it is determined that the previous error indication is being displayed (YES in S24), subsequently, the job processing control unit determines whether that error indication has been removed (that is, whether the "CONTINUE" key has been selected in FIG. 6) (S25).

In step S25, if it is determined that the previous error indication has been removed (YES in S25), the error display unit removes the error indication and, if any, in step S26, the output unit outputs the low job whose output is suspended in step S20.

In step S24, if it is determined that no previous error indication is being displayed (NO in S24), processing for the input job (high job) is completed.

As is clear from the foregoing, in the skip mode, until an error indication is removed (until an authentication error is eliminated), even if a proper low job is detected, the proper low job is not output (printed). It is to be noted that certain processing before outputting, including reading and authentication, is performed on subsequent low jobs after the detected proper low job.

As described above, with the image forming apparatus according to the present embodiment of the present invention, by the skip mode or cancel mode set in advance, job processing upon the occurrence of an authentication error can be controlled.

In the skip mode, the job processing control unit in the control unit determines whether each low job is proper or improper and skips a low job determined to be improper.

Accordingly, even if an authentication error occurs, subsequent job processing can proceed.

In the skip mode, if an improper low job is detected, the error display unit displays an error message. The condition for outputting a proper low job detected thereafter is removal of the error indication (elimination of the authentication error). It is to be noted that, irrespective of whether the error indication is removed, certain processing prior to outputting, such as reading and authentication of subsequent low jobs, is performed.

Accordingly, an authentication error can be prevented from not being recognized by a user, while at the same time job processing can be smoothly carried out.

In the cancel mode, the job processing control unit in the control unit determines whether each low job is proper or improper and cancels job processing after a low job is determined to be improper. The low job determined to be improper can be deleted by a predetermined cancel operation.

As described above, with the image forming apparatus according to the embodiment of the present invention, in particular, with the setting of the skip mode, inconvenience caused by being unable to output a proper job can be avoided, while at the same time recognition of an authentication error by a user can be ensured.

Skipping an improper job effectively and automatically enables job processing to be carried out promptly.

Accordingly, an image forming apparatus capable of smoothly outputting based on rational job processing and offering great convenience, reliability, operability, and flexibility can be achieved.

As described above, the image forming apparatus according to the embodiment of the present invention can be achieved by functions performed by a computer in response to instructions of a program (software). The program can send instructions to constituent elements (data input unit, authentication unit, output unit, control unit, display unit, and operation unit) of the image forming apparatus (computer) according to the embodiment of the present invention and causes them to execute the above predetermined processing. That is, the functions of the image forming apparatus according to the embodiment of the present invention can be achieved by specific means in which the program and computer work in cooperation with each other.

It is to be noted that the program can be provided in whole or in part by a magnetic disk, optical disk, semiconductor memory, and any other given computer-readable recording medium, for example, and the program read from the recording medium can be installed into the image forming apparatus (computer) and executed. The program can also be executed after being downloaded directly into the computer via a communication line through no such recording medium.

As described above, the image forming apparatus according to the embodiment of the present invention is described with reference to a preferable embodiment. However, the image forming apparatus according to the embodiment of the present invention is not limited to the embodiment described above and can be modified in various ways within the scope of the present invention.

For example, in skip-mode operation, at the time of detecting a proper low job, that low job can be immediately output to further reduce the output time.

In cancel-mode operation, in addition to a low job determined to be improper in step S12, subsequent low jobs can also be deleted.

In the above embodiment, the control boards of the constituent units working in cooperation with one another form a computer of an image forming apparatus. Alternatively, for example, the control unit 40 of the image forming apparatus 1 may have a main control board forming the computer and controlling each hardware element.

The image forming apparatus may be a multifunction peripheral (MFP) or a combination of multiple devices. In the latter case, the control boards of the constituent units may be separately incorporated into the devices. For example, a scanner may have a reading unit, a printer may have a job processing control unit and output unit, and an authentication server may have an authentication unit.

In part, in an embodiment, the invention may be summarized as follows.

An image forming apparatus according to an embodiment of the present invention includes a reading unit, an authentication unit, a job processing control unit, and an output unit. The reading unit may be configured to sequentially read a plurality of low jobs making up a high job, wherein each of the low jobs has a corresponding user information element.

The authentication unit may be configured to determine whether each of the low jobs is proper or improper by verifying the user information element against a user information table to carry out authentication, wherein the user information table includes a registration of user information elements indicating authorized users. The job processing control unit may be configured to control, in a skip mode, if a low job is determined to be improper in the determination, an operation of skipping the low job determined to be improper and sequentially performing the reading and determination on subsequent low jobs. The output unit may be configured to output a low job determined to be proper in the determination.

Additionally, the authentication unit may store the user information table.

As described above, with the embodiment of the present invention, in outputting a high job made up of a plurality of low jobs, data processing after an authentication error occurs in a low job can be efficiently carried out, thus enabling jobs to be output promptly and stably.

The image forming apparatus further may include, in addition to the above-mentioned configuration, an error display unit. The error display unit may be configured to display an error indication if the low job is determined to be improper. The error display unit may be configured to remove the error indication in response to a predetermined operation.

Accordingly, the image forming apparatus can remove an error indication so as to un-suspend an output processing.

In addition to the above-mentioned configuration, the job processing control unit may be configured to, if the subsequent low jobs are determined to be proper after the low job is determined to be improper, suspend outputting the subsequent low jobs until the error indication is removed.

Accordingly, even if an authentication error occurs, subsequent job processing can proceed.

In addition to the above-mentioned configuration, the job processing control unit may be configured to, if the subsequent low jobs are determined to be proper after the low job is determined to be improper, control the reading and authentication of the subsequent low jobs, even if the error indication is not removed.

Accordingly, an authentication error can be prevented from not being recognized by a user, while at the same time job processing can be smoothly carried out.

In addition to the above-mentioned configuration, the job processing control unit may be configured to control, in a cancel mode, after the low job is determined to be improper, an operation of canceling the reading, authentication, and outputting on the subsequent low jobs.

Accordingly, an improper low job can be automatically cancelled in the cancel mode.

In addition to the above-mentioned configuration, the job processing control unit may be configured to delete the subsequent low jobs cancelled in response to a cancel operation.

Accordingly, unauthorized use of the image forming apparatus by an unregistered user can be prevented.

The image forming apparatus further may include, in addition to the above-mentioned configuration, an error handling setting unit. Here, the error handling setting unit may be configured to set the skip mode or the cancel mode if the low job is determined to be improper. The job processing control unit may be configured to control job processing according to the mode set by the error handling setting unit.

Accordingly, the skip mode and cancel mode are freely switchable, so that the image forming apparatus is convenient.

In addition to the above-mentioned configuration, the job processing control unit may be configured to determine which of a skip mode and a cancel mode has been set by a user.

Accordingly, the user can arbitrarily select the cancel mode.

A computer-readable recording medium according to an embodiment of the present invention stores job processing program codes that are executed by a computer of an image forming apparatus. The job processing program codes include five program codes. The first program code may cause the computer to sequentially read a plurality of low jobs making up a high job. The second program code may cause the computer to store a user information table in which user information elements on authorized users are registered. The third program code may cause the computer to sequentially carry out authentication by determining whether each of the low jobs is proper or improper by verifying a user information element corresponding to the low job against the user information table. The fourth program code may cause the computer to control, in a skip mode, if a low job is determined to be improper in the determination, an operation of skipping the low job determined to be improper and sequentially performing the reading and determination on subsequent low jobs. The fifth program code may cause the computer to output of a low job determined to be proper in the determination.

As described above, with the embodiment of the present invention, in outputting a high job made up of a plurality of low jobs, data processing after an authentication error occurs in a low job can be efficiently carried out, thus enabling jobs to be output promptly and stably.

A job processing method according to an embodiment of the present invention may include (1) a reading unit being able to sequentially reading a plurality of low jobs making up a high job, (2) an authentication unit being able to store a user information table in which user information elements on authorized users are registered, (3) the authentication unit being able to sequentially determine whether each of the low jobs is proper or improper by verifying a user information element corresponding to the low job against the user information table, to carry out authentication, (4) a job processing control unit being able to control, in a skip mode, if a low job is determined to be improper in the determination, an operation of skipping the low job determined to be improper and sequentially performing the reading and determination on subsequent low jobs, and (5) an output unit being able to output a low job determined to be proper in the determination.

Additionally, the authentication unit may store the user information table.

As described above, with the embodiment of the present invention, in outputting a high job made up of a plurality of low jobs, data processing after an authentication error occurs in a low job can be efficiently carried out, thus enabling jobs to be output promptly and stably.

A job processing method, in addition to the above-mentioned configuration, further may include an error display unit displaying an error indication if the low job is determined to be improper and the error display unit removing the error indication in response to a predetermined operation.

Accordingly, the image forming apparatus can remove an error indication so as to un-suspend an output processing.

A job processing method, in addition to the above-mentioned configuration, further may include, if the subsequent low jobs are determined to be proper after the low job is determined to be improper, the job processing control unit suspending output of the subsequent low jobs until the error indication is removed.

Accordingly, even if an authentication error occurs, subsequent job processing can proceed.

A job processing method, in addition to the above-mentioned configuration, further may include, if the subsequent low jobs are determined to be proper after the low job is determined to be improper, the job processing control unit controlling the reading and authentication of the subsequent low jobs, even if the error indication is not removed.

Accordingly, an authentication error can be prevented from not being recognized by a user, while at the same time job processing can be smoothly carried out.

A job processing method, in addition to the above-mentioned configuration, further may include the job processing control unit controlling, in a cancel mode, after the low job is determined to be improper, an operation of canceling the reading, authentication, and outputting on the subsequent low jobs.

Accordingly, an improper low job can be automatically cancelled in the cancel mode.

The job processing method, in addition to the above-mentioned configuration, further may include the job processing control unit deleting the subsequent low jobs cancelled in response to a cancel operation.

Accordingly, unauthorized use of the image forming apparatus by an unregistered user can be prevented.

A job processing method, in addition to the above-mentioned configuration, further may include an error handling setting unit setting the skip mode or the cancel mode if the low job is determined to be improper; and the job processing control unit controlling job processing according to the mode set by the error handling setting unit.

Accordingly, the skip mode and cancel mode are freely switchable, so that the image forming apparatus is convenient.

In addition to the above-mentioned configuration, the job processing control unit may determine which of a skip mode and a cancel mode has been set by a user.

Accordingly, the user can arbitrarily select the cancel mode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
a central processing unit;
a read-only memory;
a random-access memory; and
a control board configured to include the central processing unit, the read-only memory, and the random-access memory, wherein the control board comprises:
a reading unit configured to sequentially read a plurality of low jobs making up a high job, wherein each of the plurality of low jobs has a job ID, a corresponding user information element, and actual data, wherein the reading unit is further configured to read each of the plurality of low jobs beginning from the job ID and acquire the corresponding user information element;
an authentication unit configured to determine whether each of the plurality of low jobs is proper or improper by verifying the corresponding user information element to each of the plurality of low jobs against a user information table to carry out authentication, wherein the user information table includes a registration of user information elements indicating authorized users;

a job processing control unit configured to control, in a skip mode, if a first low job is determined to be improper, an operation of skipping the first low job determined to be improper and sequentially performing the reading and determination on subsequent low jobs;

an output unit configured to output a low job determined to be proper; and an error display unit configured to display a first error indication if the first low job is determined to be improper and remove the first error indication in response to a predetermined operation; wherein after the first low job is determined to be improper and a second low job is determined to be improper, the authentication unit is configured to determine whether a third low job is proper or improper, without displaying a second error indication according to the second low job and without removing the first error indication.

2. The image forming apparatus according to claim 1, wherein the job processing control unit is configured to, if the subsequent low jobs are determined to be proper after the first low job is determined to be improper, suspend outputting the subsequent low jobs until the first error indication is removed.

3. The image forming apparatus according to claim 1, wherein the job processing control unit is configured to, if the subsequent low jobs are determined to be proper after the first low job is determined to be improper, control the reading and authentication of the subsequent low jobs, even if the first error indication is not removed.

4. The image forming apparatus according to claim 1, wherein the job processing control unit is configured to control, in a cancel mode, after the first low job is determined to be improper, an operation of canceling the reading, authentication, and outputting on the subsequent low jobs.

5. The image forming apparatus according to claim 4, wherein the job processing control unit is configured to delete the subsequent low jobs cancelled in response to a cancel operation.

6. The image forming apparatus according to claim 4, wherein the control board comprises an error handling setting unit configured to set the skip mode or the cancel mode if the first low job is determined to be improper, wherein the job processing control unit is configured to control job processing according to a mode set by the error handling setting unit.

7. The image forming apparatus according to claim 1, wherein the authentication unit stores the user information table.

8. The image forming apparatus according to claim 4, wherein the job processing control unit is configured to determine which of the skip mode and the cancel mode has been set by a user.

9. A non-transitory computer-readable recording medium that stores job processing program codes that are executed by a computer of an image forming apparatus, the job processing program codes comprising:

first program code for causing the computer to sequentially read a plurality of low jobs making up a high job, wherein each of the plurality of low jobs includes a job ID, a corresponding user information element, and actual data, and wherein the first program code causes the computer to read each of the plurality of low jobs beginning with the job ID and acquire the corresponding user information element;

second program code for causing the computer to store a user information table in which user information elements on authorized users are registered;

third program code for causing the computer to carry out authentication by sequentially determining whether each of the plurality of low jobs is proper or improper by verifying the corresponding user information element to each of the plurality of low jobs against the user information table;

fourth program code for causing the computer to control, in a skip mode, if a first low job is determined to be improper, an operation of skipping the first low job determined to be improper and sequentially performing the reading and determination on subsequent low jobs;

fifth program code for causing the computer to output a low job determined to be proper in the determination; and sixth program code for causing the computer to display a first error indication if the first low job is determined to be improper and remove the first error indication in response to a predetermined operation; wherein if a second low job is determined to be improper after the first low job is determined to be improper, the third program code causes the computer to determine whether a third low job is proper or improper without displaying a second error indication according to the second low job and without removing the first error indication.

10. A job processing method comprising:

sequentially reading, via a reading unit of an image forming apparatus, a plurality of low jobs making up a high job, wherein each of the plurality of low jobs has a job ID, a corresponding user information element, and actual data, and wherein sequentially reading the plurality of low jobs comprises reading each of the plurality of low jobs beginning with the job ID;

acquiring, via the reading unit, the corresponding user information element of each of the plurality of low jobs;

storing, via an authentication unit, a user information table in which user information elements on authorized users are registered;

sequentially determining, via the authentication unit, whether each of the plurality of low jobs is proper or improper by verifying a user information element corresponding to the first low job against the user information table, to carry out authentication;

controlling, via a job processing control unit, in a skip mode, if a low job is determined to be improper, an operation of skipping the first low job determined to be improper and sequentially performing the reading and determination on subsequent low jobs;

outputting, via an output unit, a low job determined to be proper in the determination;

displaying, via an error display unit, a first error indication if a first low job is determined to be improper, wherein the error display unit is configured to remove the first error indication in response to a predetermined operation; and determining, via the authentication unit, if a second low job is determined to be improper after a first low job is determined to be improper, whether a third low job is proper or improper without displaying the second error indication according to the second low job and without removing the first error indication.

11. The job processing method according to claim 10, further comprising, if the subsequent low jobs are determined to be proper after the first low job is determined to be improper, suspending, via the job processing control unit, output of the subsequent low jobs until the first error indication is removed.

12. The job processing method according to claim 10, further comprising, if the subsequent low jobs are determined to be proper after the first low job is determined to be improper, controlling, via the job processing control unit, the reading and authentication of the subsequent low jobs, even if the first error indication is not removed.

13. The job processing method according to claim 10, further comprising controlling, via the job processing control unit, in a cancel mode, after the first low job is determined to be improper, an operation of canceling the reading, authentication, and outputting on the subsequent low jobs.

14. The job processing method according to claim 13, further comprising deleting, via the job processing control unit, the subsequent low jobs cancelled in response to a cancel operation.

15. The job processing method according to claim 13, further comprising:

setting, via an error handling setting unit, the skip mode or the cancel mode if the first low job is determined to be improper; and controlling, via the job processing control unit, job processing according to a mode set by the error handling setting unit.

16. The job processing method according to claim 10, further comprising storing, via the authentication unit, the user information table.

17. The job processing method according to claim 13, further comprising determining, via the job processing control unit, which of the skip mode and the cancel mode has been set by a user.

18. The job processing method according to claim 15, further comprising setting, via the error handling setting unit, the skip mode or the cancel mode in response to a user operation.

\* \* \* \* \*